United States Patent
Chheda (10) Patent No.: US 9,594,640 B1
(45) Date of Patent: Mar. 14, 2017

(54) BACKUP/RECOVERY SYSTEM AND METHOD FOR A COMPUTING ENVIRONMENT

(71) Applicant: VCE Company, LLC, Richardson, TX (US)

(72) Inventor: Nilay Chheda, San Jose, CA (US)

(73) Assignee: VCE IP Holding Company LLC, Richardson, TX (US)

(*) Notice: Subject to any disclaimer, the term of this patent is extended or adjusted under 35 U.S.C. 154(b) by 117 days.

(21) Appl. No.: 14/553,367

(22) Filed: Nov. 25, 2014

(51) Int. Cl.
G06F 11/00 (2006.01)
G06F 11/14 (2006.01)
G06F 3/0484 (2013.01)
G06F 17/30 (2006.01)

(52) U.S. Cl.
CPC ...... *G06F 11/1448* (2013.01); *G06F 3/04847* (2013.01); *G06F 17/30876* (2013.01); *G06F 11/1458* (2013.01); *G06F 11/1461* (2013.01); *G06F 11/1464* (2013.01); *G06F 11/1469* (2013.01)

(58) Field of Classification Search
CPC ............ G06F 11/1458; G06F 11/1464; G06F 11/1461; G06F 11/1448; G06F 11/1469
See application file for complete search history.

(56) References Cited

U.S. PATENT DOCUMENTS

| 6,266,784 B1* | 7/2001 | Hsiao | G06F 11/1451 714/5.11 |
| 2008/0140714 A1* | 6/2008 | Rhoads | G06F 17/30047 |
| 2015/0269029 A1* | 9/2015 | Smith | G06F 11/1435 714/15 |

\* cited by examiner

*Primary Examiner* — Charles Ehne
(74) *Attorney, Agent, or Firm* — Polsinelli PC (57) ABSTRACT

A backup/recovery system for a computing environment includes a computing device that executes an agent to obtain a recovery plan (RP) comprising one or more provisioning steps to be performed for provisioning a plurality of resources associated with a source computing environment. The RP including configuration information associated with a hardware configuration and a software configuration of a source computing environment functioning at a first operational level in which the configuration information being sufficient to restore a target computing environment to at least a portion of the first operational level of the source computing environment. From this obtained information, the agent translates the configuration information into a specified format, and outputs the translated configuration information to a computer-readable file.

18 Claims, 7 Drawing Sheets

BACKUP/RECOVERY SYSTEM AND METHOD FOR A COMPUTING ENVIRONMENT

TECHNICAL FIELD

Aspects of the present disclosure relate to computing devices and, in particular, to a backup/recovery system and method for a computing environment.

BACKGROUND

Computing resources used by enterprises, such as corporations and universities, are often provided by computing environments that utilize multiple computing devices that function in a collaborative manner to meet the computing resource needs of the enterprise. The computing devices for such computing environments are configured in various process load sharing and/or redundant configurations to provide a level of availability and reliability required by these enterprises. Nevertheless, the complexity of these computing environments typically requires that certain failover procedures, such as migration of the computing environment's operation to another computing environment, migration of a portion of the resources of the computing environment to some other portion of the computing environment, be conducted when certain components fail or cease to function at their optimal level.

SUMMARY

According to one aspect of the present disclosure, a backup/recovery system for a computing environment includes a computing device that executes an agent to obtain a recovery plan (RP) comprising one or more provisioning steps to be performed for provisioning a plurality of resources associated with a source computing environment. The RP including configuration information associated with a hardware configuration and a software configuration of a source computing environment functioning at a first operational level in which the configuration information being sufficient to restore a target computing environment to at least a portion of the first operational level of the source computing environment. From this obtained information, the agent translates the configuration information into a specified format, and outputs the translated configuration information to a computer-readable file.

BRIEF DESCRIPTION OF THE DRAWINGS

The various features and advantages of the technology of the present disclosure will be apparent from the following description of particular embodiments of those technologies, as illustrated in the accompanying drawings. It should be noted that the drawings are not necessarily to scale; however the emphasis instead is being placed on illustrating the principles of the technological concepts. Also, in the drawings the like reference characters refer to the same parts throughout the different views. The drawings depict only typical embodiments of the present disclosure and, therefore, are not to be considered limiting in scope.

DETAILED DESCRIPTION

Aspects of a backup/recovery system for a computing environment described herein provides a mechanism for backup and recovery of the configuration of a computing environment, or the migration of the configuration of one computing environment to another computing environment. Additional aspects include a backup/recovery system that produces a computer-readable file that is stored in a standardized format, such as an extensible markup language (XML) format), which may be easily transported to another computing environment using a memory structure, such as a universal serial bus (USB) memory device, optical disk, and the like, or even transmitted to the target computing environment using a communication network.

Conventional provisioning systems for computing environments may provide a mechanism for backing up the configuration of computing environments. For example, one particular conventional system includes a Site Recovery Manager™ (SRM) tool available from VMware Corporation, which is located in Palo Alto, Calif. The SRM tool provides certain features for generating a recovery plan (RP) that details how the resources (e.g., hosts and virtual objects, etc.) of the computing environment will be migrated to a recovery site, and in what order the resources are to be migrated. The SRM tool may also run custom provisioning instructions that are provided by executable scripts. Nevertheless, the RP is not easily migrated (e.g., shippable) between computing environments. Rather, users typically have to manually create new RPs on different systems, even if the RP is similar for multiple computing environments.

Figure 1:
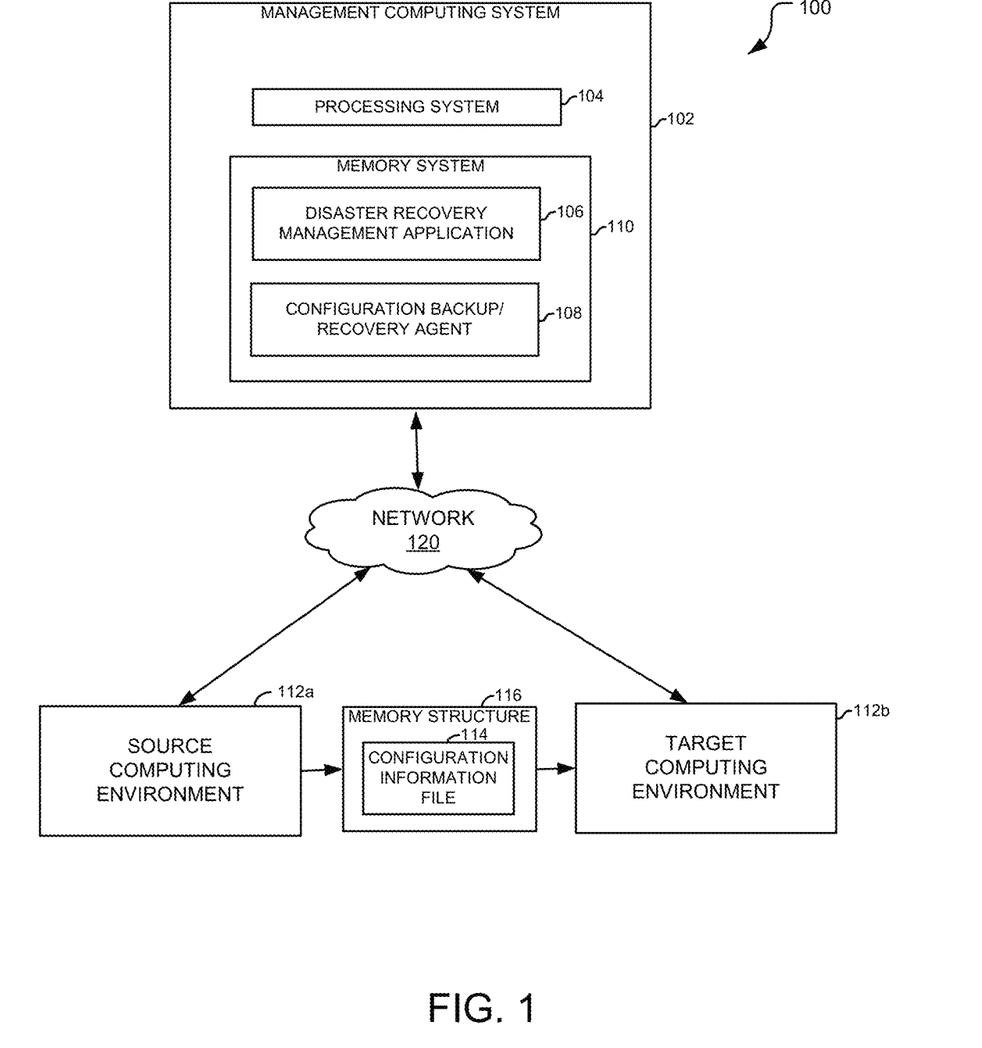
FIG. 1 illustrates an example backup/recovery system according to one embodiment of the present disclosure.

FIG. 1 illustrates an example backup/recovery system 100 according to the teachings of the present disclosure. The system 100 includes a management computing system 102 that includes a processing system 104 that executes a disaster recovery management application 106 and a configuration backup/recovery agent 108 stored in a memory system 110. When executed, the configuration backup/recovery agent 108 communicates with a source computing environment 112a to obtain hardware and software configuration information associated with the source computing environment 112a, translates the configuration information into a standardized format, and outputs the translated configuration information to a computer-readable file 114 that may then be used to provision a target computing environment 112b. Additionally, the configuration information stored in the file 114 may be used to restore all or a portion of the source computing environment 112a such as when a certain partition of the source computing environment 112a is to be migrated to another portion of the source computing environment 112a.

In a specific example of a source computing environment 112a and a target computing environment 112b that each includes a converged infrastructure (CI), the configuration information includes information associated with the hardware resources (e.g., hosts) and software resources (e.g., virtual objects, executable applications, as well as configuration parameters associated with these hosts, virtual objects, and applications, etc.) that is sufficient for restoring the target computing environment 112b to at least a portion of the operational level of the source computing environment 112a. (See FIGS. 2A and 2B). The agent 108 stores multiple provisioning steps to be performed by either the target computing environment 112b for migrating operation of the source computing environment 112a, or by the source computing environment 112a itself for restoring operation of the source computing environment 112a to a previous operational state.

In one embodiment, the configuration information includes one or more provisioning steps to be taken by the target computing environment 112b for implementing a configuration similar to that of the source computing environment 112a. In another embodiment, the steps may include one or more embedded scripts that may be executed to provision at least a portion of the target computing environment 112b. In one embodiment, the steps may be organized in a specified structure commonly referred to as a recovery plan (RP).

The configuration information file 114 may be transported to the target computing environment 112b in any suitable manner. In one embodiment, the configuration information file 114 may be transported using a memory structure 116, such as a compact disk (CD), a digital video disk (DVD), a universal serial bus (USB) based memory device, an external hard drive, and the like. In another embodiment, the configuration information file 114 may be transmitted to the target computing environment 112b using a communication network 120, such as the Internet.

Manufacturers of computing environments often create customized packages that are ideally suited for operation by each of their customers. Although the relatively high level of customization for computing environments has provided for unique adaptation of each customer's needs, ongoing maintenance for computing environments or for certain portions of the computing environments typically require operation of certain functions to be migrated to other portions of the computing environment or to another independently functioning computing environment. For example, a failure of a computing environment may require that operation of that computing environment be migrated to another computing environment. As another example, system administrators may desire to deploy two or more similarly configured computing environments to provide redundancy for enhanced reliability and/or availability. Embodiments of the present disclosure provide a solution to these problems, among other problems, by implementing a backup/recovery agent 108 that generates a file 114 which is easily transportable to a target computing environment without necessitating substantial duplicity of effort that would otherwise be required to manually provision the target computing environment to have an operational level that is at least partially similar to the source computing environment.

The agent 108 communicates directly with the source computing environment 112a to receive its configuration information, or it may work in conjunction with the disaster recovery management application 106 to obtain the configuration information. That is, the agent 108 may obtain the configuration information from the source computing environment 112a via the disaster recovery management application 106. The disaster recovery management application 106 typically manages automated orchestration and non-destructive testing for recovery plans (RPs) generated for computing environments. One example of a computing environment disaster recovery management application includes the Site Recovery Manager™ application package that is available from VMware Corporation, which is located in Palo Alto, Calif.

The computing system 102 and the computing environments 112 communicate with one another in any suitable manner. For example, the computing system 102 and the computing environments 112 communicate with each other using wireless and/or wireline communications, such as the Internet, an intranet, or another wired and/or wireless communication network. In one embodiment, the computing system 102 and the computing environments 112 communicate with one another using a packet-based communication network, such as the Internet. Embodiments of the present disclosure recognize that portions of the communication between the computing environments 112, and the computing system 102 may traverse various network forms, whether wired, optical, or wireless. In one aspect, the computing system 102 and computing environments 112 communicate with one another using any suitable protocol or messaging scheme. For example, they may communicate using a Hypertext Transfer Protocol (HTTP), extensible markup language (XML), extensible hypertext markup language (XHTML), or a Wireless Application Protocol (WAP) protocol. Other examples of communication protocols exist.

Figure 2A:
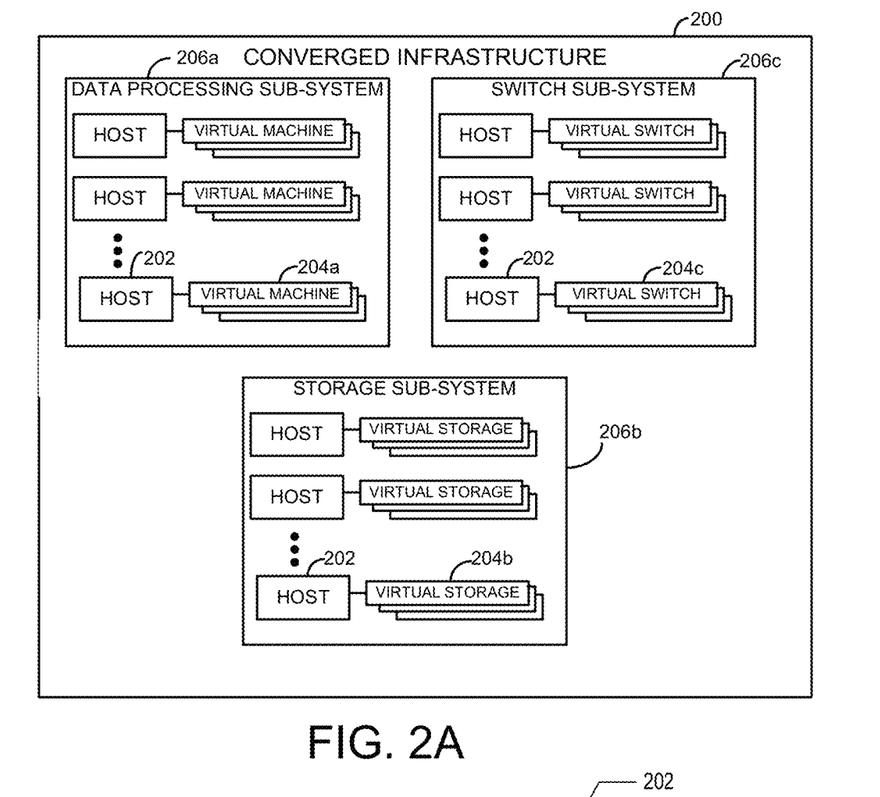
FIG. 2A illustrates an example computing environment that may be implemented as one specific example of a computing environment according to one embodiment of the present disclosure.

FIG. 2A illustrates an example converged infrastructure 200 that may be implemented as one specific example of a computing environment 112 according to the teachings of the present disclosure. The converged infrastructure 200 may be any type having multiple hosts 202 that each executes one or more virtual objects (e.g., virtual machines 204a, virtual storage objects 204b, and virtual switch objects 204c). In a particular example, the converged infrastructure 200 such as that shown in FIG. 2A includes components found in Vblock™ System infrastructure packages available from VCE, LLC, which is located in Richardson, Tex. Converged infrastructures are often implemented in environments where relatively high reliability and/or availability are desired, such as in an enterprise environment. Nevertheless, it is contemplated that any computing environment, such as a computer cluster, computing grid, blade array, and/or other computing infrastructure may be configured using the teachings of the present disclosure.

Converged infrastructures may involve multiple computing components pre-integrated into an optimized computing solution. The computing components of a converged infrastructure solution may include servers, data storage components, networking equipment and software for managing the integrated components. To assist in the scalability, management and sharing of resources, particularly in large data center environments, converged infrastructures may involve a pool of server, storage and networking capacities, typically virtualized, that can shared by multiple applications.

The hosts of a converged infrastructure are often referred to as compute servers. Nevertheless, a 'host' may be any physical device and/or component that supports the operation of virtual resources and services provided by those virtual resources. The particular converged infrastructure 200 as shown includes several sub-systems, such as a data processing sub-system 206a, a data storage sub-system 206b, and a switch sub-system 206c. Nevertheless, it should be understood that other converged infrastructures may include additional, fewer, or different types of sub-systems without departing from the spirit and scope of the present disclosure.

In one aspect, the data storage sub-system 206b includes computer-readable memory structures for storing data used by the converged infrastructure 200, which may include network attached storage (NAS) arrays and/or storage area network (SAN) arrays that are facilitated by multiple virtual objects (e.g., virtual storage objects 204b). The switch sub-system 206c provides for communication among the various sub-systems of the converged infrastructure 200, and may include components, such as fabric interconnect systems, Ethernet switches/routers, multilayer director switches (MDSs), and the like. The data processing sub-system 206a executes applications that access, store, and otherwise manipulate data stored by the converged infrastructure 200. For a particular example, either of the data storage sub-system 206b, the switch sub-system 206c, and/or the data processing sub-system 206a may comprise a blade computing platform having multiple hosts (e.g., blade computing devices) 202 that each executes one or more virtual objects.

Each sub-system includes multiple hosts 202 that each executes one or more virtual objects, which in this particular example, are virtual machines (VMs) 204a, virtual storage objects 204b, and virtual switch objects 204c. For example, virtual objects, such as the VMs 204a may include software-based operating systems that are emulated on their respective hosts, which are physical computing devices. For each host, its respective VMs may be managed by a hypervisor that provides a virtual architecture for each VM's operation and controls various aspects of their operation. One example of a suitable hypervisor includes the VMWARE ESX™ software suite that is available from VMware Corporation, which is located in Palo Alto, Calif.

Figure 2B:
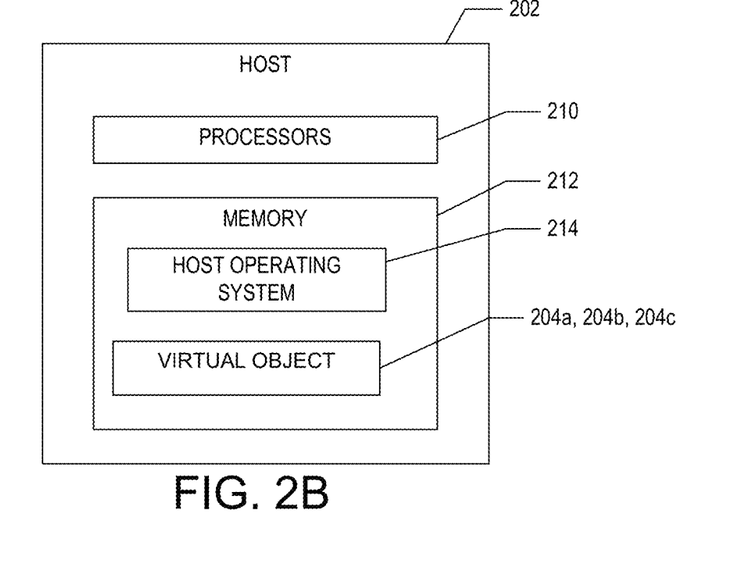
FIG. 2B illustrates an example host implemented on the computing environment according to one embodiment of the present disclosure.

FIG. 2B illustrates an example host 202 implemented on the converged infrastructure 200 according to one aspect of the application alerting system 100. In general, the host 202 is a computing or processing device that includes one or more processors 210 and a memory 212. For example, the host 202 can be a personal computer, such as a laptop or notebook computer, a workstation, or other processing device such as a tablet computer. In a particular embodiment, the host 202 is a rack mounted host, such as blade host in which multiple blade hosts share a common backplane for communication with one another and for receiving power from a rack mounted power distribution unit. The memory 212 stores a host operating system 214 and one or more virtual objects (e.g., VMs 204a, virtual storage objects 204b, and virtual switch objects 204c) that are executed by the processor 210. The host operating system 214 controls and manages the operation of the virtual objects executed on the host 202. For example, control signaling for starting, stopping, and/or changing operating parameters of each virtual object is managed through the host operating system 214.

Figure 3A:
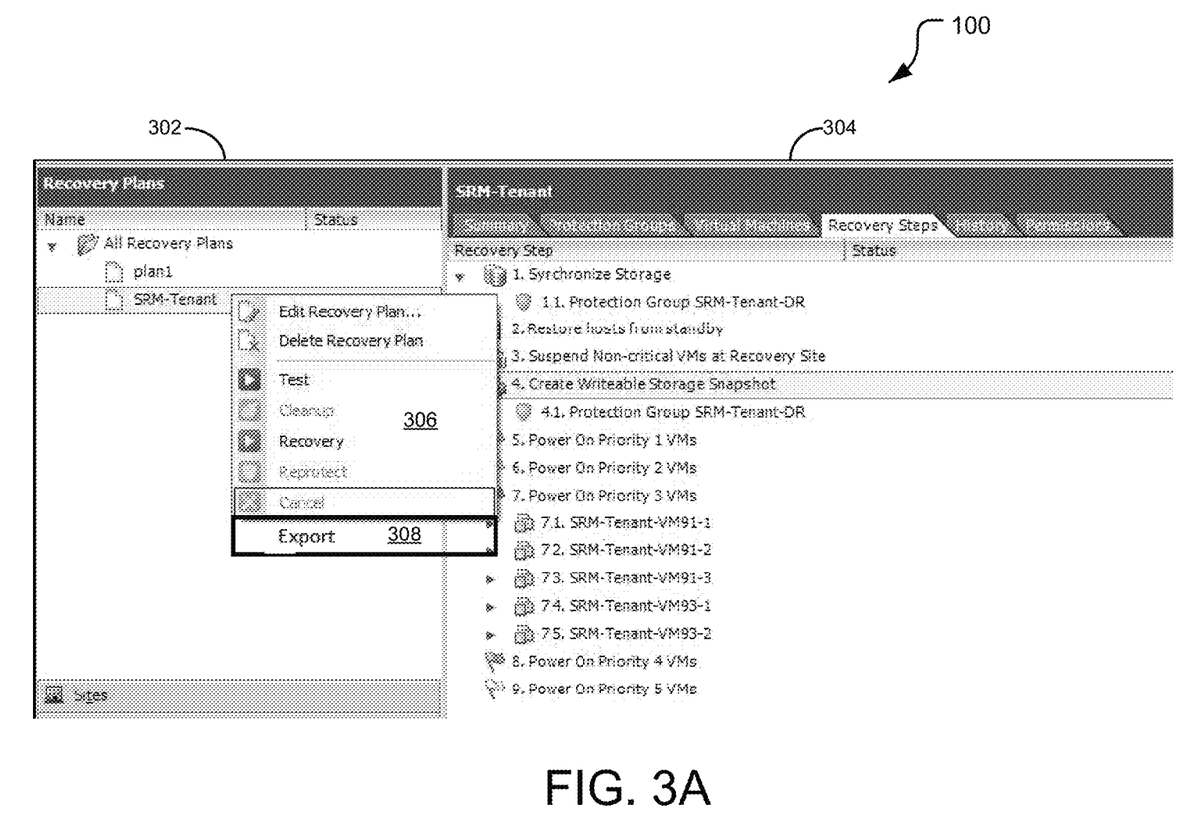
FIGS. 3A and 3B illustrate portions of a graphical user interface (GUI) that may be generated by the disaster recovery management application to include export and import capabilities according to one embodiment of the present disclosure.
Figure 3B:
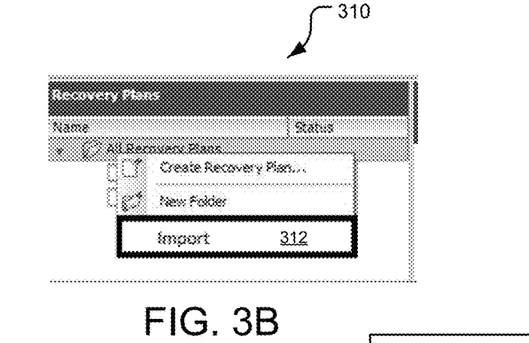

FIGS. 3A and 3B illustrate portions of a graphical user interface (GUI) 300 that may be generated by the disaster recovery management application 106 to include export and import capabilities according to one embodiment of the present disclosure. In one embodiment, the GUI 300 may be generated by the SRM tool described above; nevertheless, the GUI 300 may be generated by any suitable disaster recovery management application 106. Additionally, other embodiments contemplate that the GUI 300 may be generated by the agent 108 without any involvement by the disaster recovery management application 106.

As shown in FIG. 3A, the GUI 300 includes a RP list pane 302 and a RP detail pane 304. The RP list pane 302 includes a list of RPs that have been previously generated by the disaster recovery management application 106. For example, the RP list pane 302 as shown includes two RPs, namely, a RP named 'plan1' and another RP named 'SRM-Tenant.' The RP detail pane 304 displays a list of steps (e.g., recovery steps) that are included in the RP selected in the RP list pane 302. For example, the RP detail pane 304 shows the various steps from the 'SRM-Tenant' RP, which has been selected in the RP list pane 302. As shown, the steps include a first step to synchronize a 'SRM-Tenant-DR' protection group, a second step to restore hosts functionality, a third step to suspend the non-critical VMs, a fourth step to create a writeable storage snapshot, a fifth through ninth steps to power VMs with priority levels 1 through 5. Nevertheless, it should be understood that an RP may include any suitable step without departing from the spirit and scope of the present disclosure.

When a particular RP is selected in the RP list pane 302, such as by selecting a particular RP using a right mouse click, a menu 306 may be displayed that provides various operations that may be performed on the selected RP in which one of the various operations includes an 'export' button 308. When the 'export' button 308 is selected, the agent 108 may be called to generate a file using the selected RP as described herein. The exported file may also be imported to the SRM. For example, FIG. 3B illustrates an example menu screen 310 that may be generated by the disaster recovery management application 106. The menu screen 310 includes an 'import' button 312 that when selected, imports a RP file selected by the user.

In one embodiment, the agent 108 may compare the configuration information stored in the file 114 with any configuration information obtained from the target computing environment 112 and generate an alert when an instance of the target configuration information is incompatible the configuration information stored in the file 114. For example, the agent 108 may generate an alert screen 400 such as that shown in FIG. 4A when such an incompatibility is found. As shown, the alert screen 400 displays an unique identifier 402 associated with the instance along with additional text indicating the nature of the incompatibility. Additionally, the alert screen 400 may include one or more user selectable buttons or fields such that the configuration information may be adjusted to compensate for the incompatibility. For example, the alert screen 400 may display a manual resource selection field 404 that allows the user to manually select a resource to be used by the target for deploying the incompatible resource from the source computing environment. As another example, the alert screen 400 may display a cancel button 406 that allows the user to cancel provisioning of that one resource.

In another embodiment, the agent 108 may generate a user interface for receiving any user supplied mapping information for mapping the configuration of the source computing environment to the configuration of the target computing environment 112b. As shown in FIG. 4B, the agent 108 may generate an IP mapping list screen 420 for receiving user input regarding changes to IP addresses that may be incurred when the target computing environment 112b is located at a different network address, which may be in a different geographical site and therefore, may be connected to a different communication network. For example, the IP mapping list screen 420 may display one or more IP addresses associated with the configuration information that each includes an editable field that may be filled in by the user for inputting the IP addresses to be mapped. Entry of the mapping of the IP addresses may be performed prior to provisioning of the target computing environment 112b such that the IP mapping information may be applied as the target computing environment 112b is being provisioned.

Figure 4A:
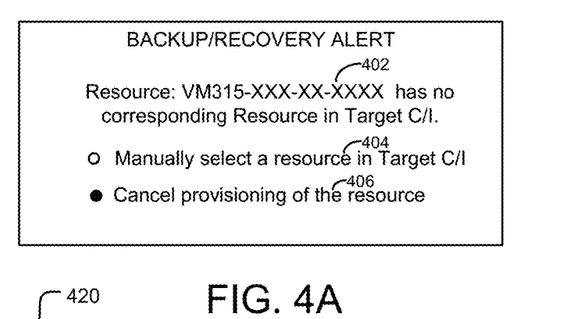
FIG. 4A illustrates an example alert screen that may be generated by the disaster recovery management application according to one embodiment of the present disclosure.
Figure 4B:
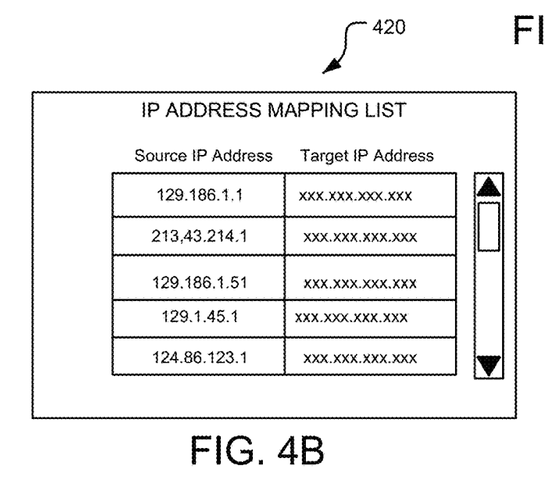
FIG. 4B illustrates an example IP mapping list screen that may be generated by the disaster recovery management application according to one embodiment of the present disclosure.

FIGS. 4A and 4B illustrate several examples showing how the agent 108 may allow monitoring of the provisioning process on a target computing environment 112b, and provides for entry of user supplied input to adjust for certain incompatibilities between the source and target computing environments. Nevertheless, it should be understood that changes may be made without departing from the spirit and scope of the present disclosure. For example, mapping lists for parameters other than IP addresses may be provided for entry of user supplied mapping data. Additionally, the aesthetic layout (e.g., look and feel) of each screen may be different from that as shown. For example, the agent 108 may provide an IP mapping screen that only displays one source IP address at a time rather than that shown in FIG. 4B in which multiple IP addresses are shown simultaneously.

Figure 5:
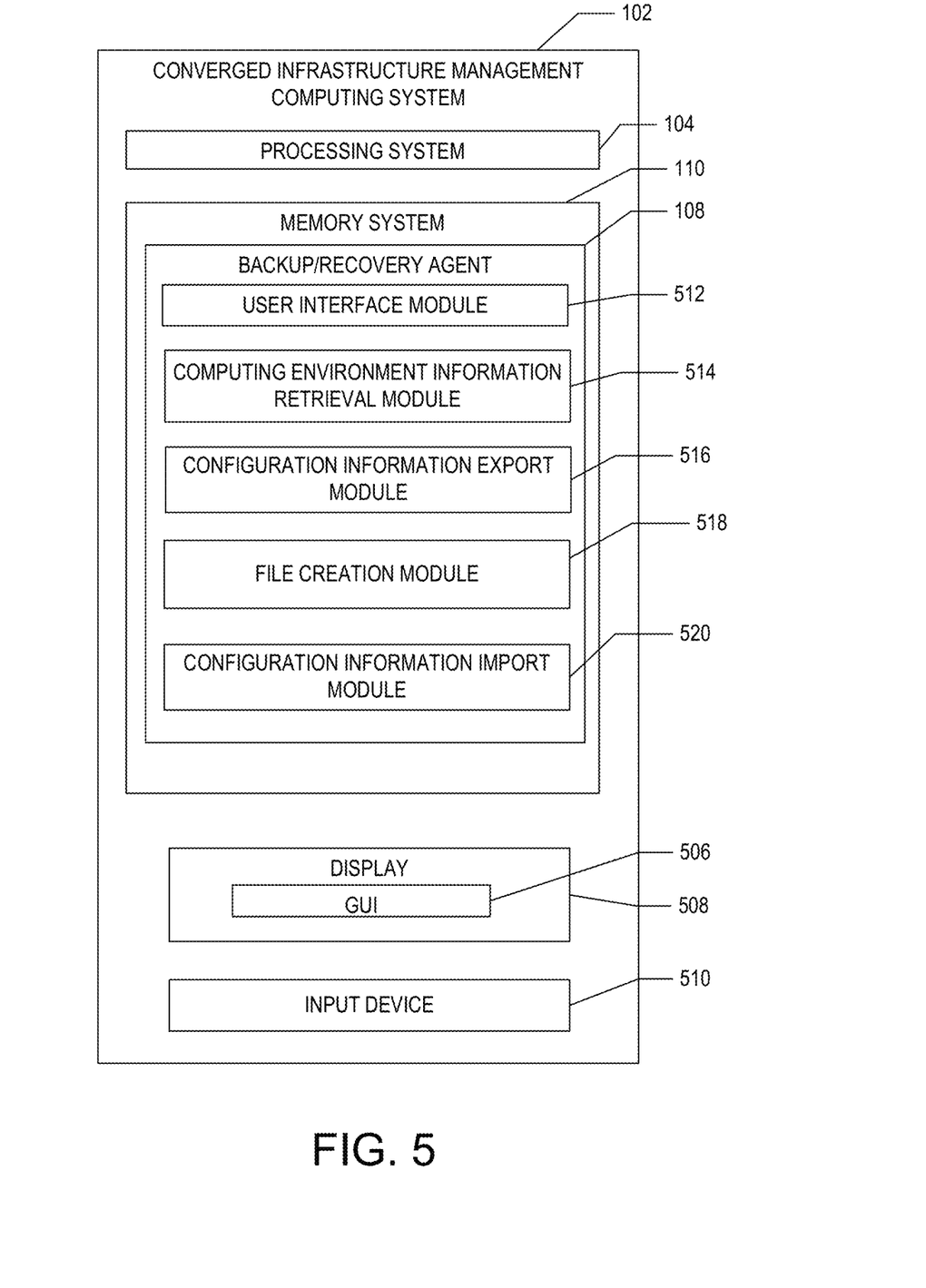
FIG. 5 illustrates an example block diagram depicting an example backup/recovery agent executed on the converged infrastructure management computing system according to one embodiment of the present disclosure.

Referring now to FIG. 5, a block diagram of an example configuration backup/recovery agent 108 executed on the management computing system 102, is depicted according to one embodiment of the present disclosure. Examples of the management computing system 102 include one or more personal computers, mobile computers and/or other mobile devices, and other computing devices. The configuration backup/recovery agent 108 is stored in a memory system 110 (i.e., computer readable media) and is executed on a processing system 104 of the management computing system 102. According to one aspect, the operations management computing system 102 also includes a graphical user interface (GUI) 506 displayed on a display 508, such as a computer monitor, for displaying data associated with the computing environments 112. The management computing system 102 also includes an input device 510, such as a keyboard or a pointing device (e.g., a mouse, trackball, pen, or touch screen) to enter data into or interact with the GUI 506. According to one aspect, the configuration backup/recovery agent 108 includes instructions or modules that are executable by the processing system 504 as will be described in detail herein below.

The computer readable medium 110 includes volatile media, nonvolatile media, removable media, non-removable media, and/or another available medium. By way of example and not limitation, non-transitory computer readable medium 110 comprises computer storage media, such as non-transient storage memory, volatile media, nonvolatile media, removable media, and/or non-removable media implemented in a method or technology for storage of information, such as computer readable instructions, data structures, program modules, or other data.

A user interface module 512 facilitates the receipt of input data and/or output data from or to a user, respectively. The user interface module 512 may display information associated with the source computing environment 112a or target computing environment 112b that may include, for example, icons representing the resources of its respective computing environment, a textual list of resources with their configuration parameters, and the like. In another example, the user interface 512 may also receive user input for manipulating or otherwise modifying the configuration information (e.g., the RP). The user interface module 512 may also display one or more selectable fields, editing screens, and the like for receiving the user configuration information from the user.

A configuration information retrieval module 514 retrieves configuration information from the source computing environments 112a. In one embodiment, the configuration information retrieval module 514 retrieves configuration information directly from the source computing environment 112a by communicating with the source computing environment 112a. In another embodiment, the configuration information retrieval module 514 retrieves the configuration information from the disaster recovery management application 106. For example, the agent 108 may be executed as a separate process from that of the disaster recovery management application 106 such that the agent 108 may communicate with the disaster recovery management application 106 using one or more application program interfaces (APIs) exposed by disaster recovery management application 106. As another example, the agent 108 may be executed in the same process as the disaster recovery management application 106 such that the disaster recovery management application 106 directly controls the operation of the agent 108 to deliver configuration information to the agent 108.

A configuration information export module 516 facilitates exporting of the received configuration information. For example, the configuration information export module 516 may communicate with the user interface module 512 to generate a GUI (FIG. 3A) that includes a selectable export button 308 for receiving user input requesting export of a RP. Upon selection of the export button 308 by a user, the configuration information export module 516 organizes the received configuration information and translates the received configuration information into a standardized format, such as an XML format that may be easily stored and parsed by the configuration information import module 522 as described in detail below. An example RP that has been organized into a XML file is shown herein below:

```
<recoveryplan>
    <name>RP 1</name>
    <steps>
        <step_1>
            <synchronize storage>
                <protection_group>
                    protection group 1
                </protection_group>
            </synchronize storage>
        <step_1>
        <step_2>
            <restore_hosts_from_standby>
                <host>host 1</host>
                <host>host 2</host>
                <host>host 3</host>
            </restore_hosts_from_standby>
        </step_2>
        <step_3>
            <suspend_noncritical_VMs_at_recovery_site>
                <vm>VM 1</vm>
```

```
        <vm>VM 3</vm>
    </suspend_noncritical_VMs_at_recovery_site>
</step_3>
<step_4>
    <create_writeable_storage_snaphost>
        <protection_group>
            protection group 1
        </protection_group>
    </create_writeable_storage_snaphost>
</step_4>
<step_5>
    <power_on_priority_1_vms>
        <vm>
            <name>VM 1</name>
            <pre_steps>
                <run_command>
                    <command>sample command</command>
                    <run_on>vm</run_on>
                    <timeout>5000</timeout>
                </run_command>
            </pre_steps>
            <post_steps>
                <run_command>
                    <command>sample command</command>
                    <run_on>vm</run_on>
                    <timeout>5000</timeout>
                </run_command>
            </post_steps>
        </vm>
    </power_on_priority_1_vms>
</step_5>
<step_6>
    <power_on_priority_2_vms>
        <vm>
            <name>VM 2</name>
            <pre_steps>
                <run_command>
                    <command>sample command</command>
                    <run_on>vm</run_on>
                    <timeout>5000</timeout>
                </run_command>
            </pre_steps>
            <post_steps>
                <run_command>
                    <command>samplecommand</command>
                    <run_on>vm</run_on>
                    <timeout>5000</timeout>
                </run_command>
            </post_steps>
        </vm>
    </power_on_priority_2_vms>
</step_6>
<step_7>
    <power_on_priority_3_vms>
        <vm>
            <name>VM 3</name>
            <pre_steps>
                <run_command>
                    <command>sample command</command>
                    <run_on>srm</run_on>
                    <timeout>5000</timeout>
                </run_command>
            </pre_steps>
            <post_steps>
                <run_command>
                    <command>sample command</command>
                    <run_on>vm</run_on>
                    <timeout>5000</timeout>
                </run_command>
            </post_steps>
        </vm>
    </power_on_priority_3_vms>
</step_7>
<step_8>
    <power_on_priority_4_vms>
        <vm>
            <name>VM 4</name>
            <pre_steps>
                <run_command>
                    <command>sample command</command>
                    <run_on>vm</run_on>
                    <timeout>5000</timeout>
                </run_command>
            </pre_steps>
            <post_steps>
                <run_command>
                    <command>sample command</command>
                    <run_on>vm</run_on>
                    <timeout>5000</timeout>
                </run_command>
            </post_steps>
        </vm>
    </power_on_priority_4_vms>
</step_8>
<step_9>
    <power_on_priority_5_vms>
        <vm>
            <name>VM 5</name>
            <pre_steps>
                <run_command>
                    <command>sample command</command>
                    <run_on>vm</run_on>
                    <timeout>5000</timeout>
                </run_command>
            </pre_steps>
            <post_steps>
                <run_command>
                    <command>sample command</command>
                    <run_on>vm</run_on>
                    <timeout>5000</timeout>
                </run_command>
            </post_steps>
        </vm>
    </power_on_priority_5_vms>
</step_9>
    </steps>
</recoveryplan>
```

As shown, the example RP includes configuration information that is organized in nine steps that when imported to the target computing environment 112b, are executed to replicate the same configuration that was exported by the source computing environment 112a. in the sequential order as shown. Additional details relating to the information included in the RP file are described in detail below.

A file creation module 518 facilitates the creation of a file having the configuration information stored therein. In one embodiment, the file creation module 518 writes the configuration information to a portable storage device, such as a USB stick or a CD that may be transported to the target computing environment 112b. In another embodiment, the file creation module 518 write the configuration information to a file that may be transmitted to the target computing environment 112b using a communication network, such as the Internet.

A configuration information import module 520 facilitates importing of the configuration information stored in the file 114 into memory 110 of the computing system 102 or the memory of another computing system, such as one that executes another instance of the disaster recovery management application 106 described above. For example, the import module 520 may be called when an 'import' button 320 from the menu screen 320 (FIG. 3B) of the disaster recovery management application 106 is selected by the user. Nevertheless, the import module 520 may be called using any suitable mechanism, such as via a user interface screen directly controlled by the agent 108.

The import module 520 may also execute the file to provision the target computing environment 112b according to the configuration information included in the file 114. For example, the import module 520 may interpret the file 114 to extract the configuration information that was stored in the example file 114 and perform the configuration steps included therein. In the particular file 114 shown above, when imported to the target computing environment 112b, the import module 520 executes the steps included in the example file named 'RP1' to replicate the same configuration or at least a portion of the configuration that was exported by the source computing environment 112a. The steps may be executed in the sequential order as shown or in any suitable sequence that may be defined by the user via the GUI 506.

The steps included in the 'RP1' file include a synchronize storage step (step 1), a restore hosts from standby step (step 2), a suspend non-critical VMs step (step 3), a create writable storage snapshot step (step 4), a power on the VMs having first level of priority step (step 5), a power on the VMs having a second level of priority step (step 6), a power one the VMs having a third level of priority step (step 7), a power on the VMs having a third level of priority step (step 7), a power one the VMs having a fourth level of priority step (step 8), and a power on the VMs having a fifth level of priority step (step9). Thus, the import module 520 may parse the 'RP1' file and perform these steps on the target computing environment 112b to configure the target computing environment 112b to replicate at least a portion of the source computing environment 112a on the target computing environment 112b.

In one embodiment, the configuration information may include one or more calls to scripts that are embedded in the file. For the example 'RP1' file shown, steps 5, 6, 7, 8, and 9 each includes a call 'sample command' to a script that may be executed to perform one or more provisioning steps on the target computing environment 112b. In this particular file 114, for example, the step 5 includes a call to a sample command that may include one or more instructions to provision those VMs having a first level of priority. Nevertheless, it should be understood that the file may include a call to any script that when invoked, performs any suitable set of instructions for provisioning the target computing environment 112b according to the configuration information included in the file 114.

It should be appreciated that the modules described herein are provided only as examples, and that the client may have different modules, additional modules, or fewer modules than those described herein. For example, one or more modules as described above with reference to FIG. 5 may be combined into a single module. As another example, certain modules described herein may be encoded on, and executed on other computing systems, such as on the computing system 102, or one of the other resources (e.g., hosts or VMs) of the source computing environment 112a or a target computing environment 112b.

Figure 6:
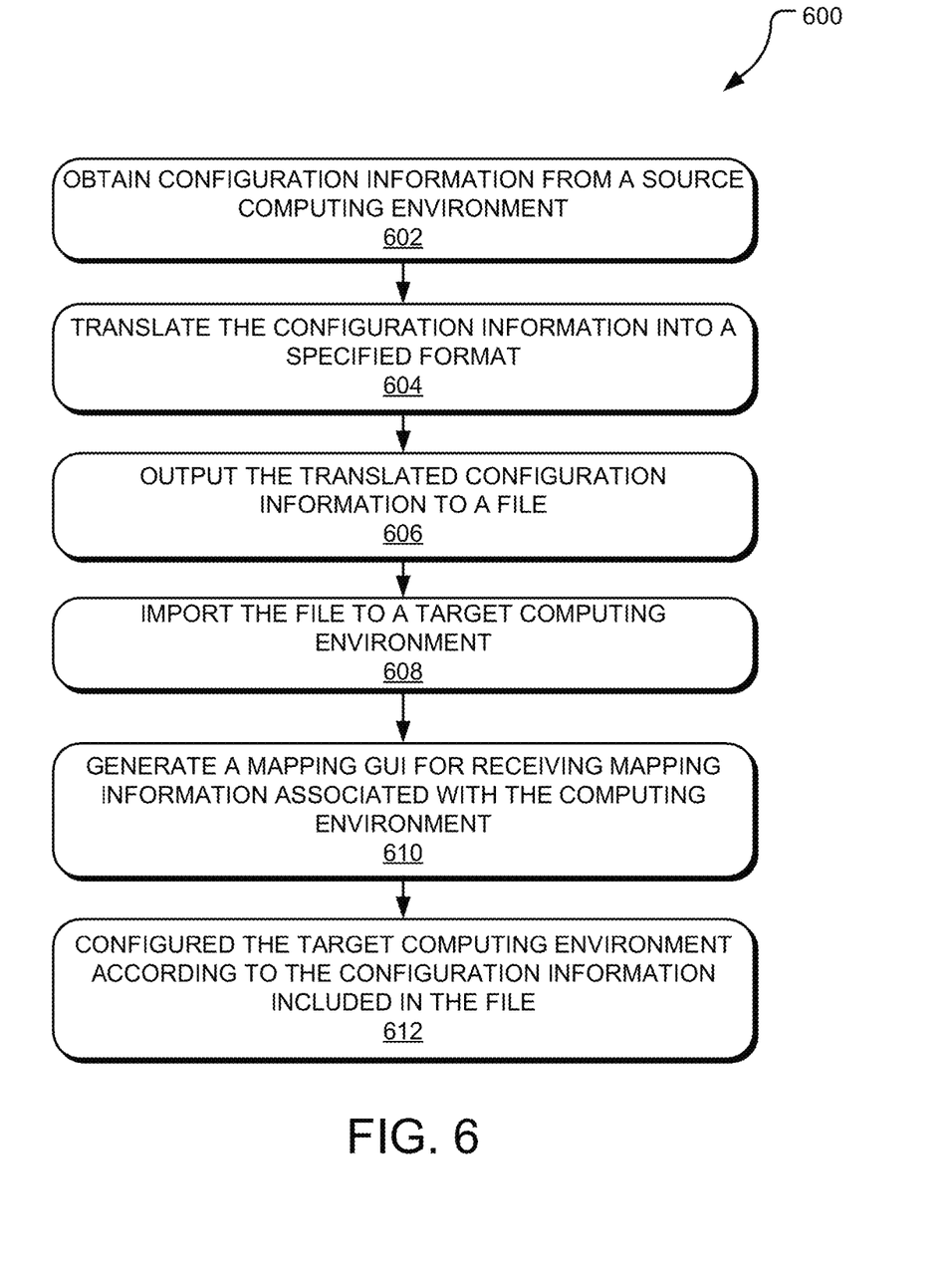
FIG. 6 illustrates an example process that is performed by the system to export configuration information associated with a source computing environment and import the exported configuration information to a target computing environment according to one embodiment of the present disclosure.

FIG. 6 illustrates an example process that is performed by the system 100 to export configuration information associated with a source computing environment and import the exported configuration information to a target computing environment according to the teachings of the present disclosure. In step 602, the agent 108 obtains configuration information associated with a source computing environment. In one embodiment, the configuration information includes a series of provisioning steps to be performed by the target computing environment. In another embodiment, the series of provisioning steps comprises a RP. The agent 108 then translates the configuration information into a specified format, such as a XML format in step 604.

In step 606, the agent 108 outputs the translated information to a file, such as a RP. In one embodiment, the agent 108 writes the file to a memory structure, such as a USB memory stick, a CD, a DVD, and the like. In another embodiment, the agent 108 transmits the file to the target computing environment using a communication network, such as the Internet.

In step 608, the agent 108 imports the file to a target computing environment. The agent 108 may be the same instance executed on the computing system 102 or may be another instance of the agent executed on another computing system. Additionally, the target computing environment may be a different computing environment than the source computing environment, or alternatively, the target computing environment may comprise the source computing environment.

In step 610, the agent 108 optionally obtains information associated with the resources of the target computing environment, compares the obtained information with the configuration information included in the file, and generates at least one mapping GUI for receiving mapping information from a user. For an example in which the target computing environment is located at a different site than the source computing environment, one or more site-based parameters (e.g., IP addressing scheme of any externally coupled communication networks) may differ due to other types of components located at the site of the target computing environment. The agent 108 may identify these differences and generate a mapping GUI that allows the user to map the parameters associated with the source computing environment to those of the target computing environment. In another embodiment, the agent 108 may generate a mapping file that maps the configuration information from the source computing environment 112a to that of the target computing environment 112b such that, when the RP may be used to automatically provision the target computing environment 112b.

In step 612, the agent 108 configures the target computing environment 112b according to configuration information included in the file. In one embodiment, the file may include one or more embedded scripts that are called during execution of the steps of the file. In another embodiment, the agent 108 may generate a GUI to receive modification to the configuration information when an appropriate matching resource on the target computing environment is not found. For example, if the agent 108 attempts to provision a resource on the target computing environment that is non-existent or is in a failed state, it may generate a GUI that alerts the user to the non-matching condition, provides one or more entry fields to allow the user to specify an alternative resource for provisioning the non-matching resource.

The steps described above may be repeated for deployment of other computing environments. Nevertheless, when deployment of other computing environments are no longer needed or desired, the process ends. The description above includes example systems, methods, techniques, instruction sequences, and/or computer program products that embody techniques of the present disclosure. However, it is understood that the described disclosure may be practiced without these specific details.

In the present disclosure, the methods disclosed may be implemented as sets of instructions or software readable by a device. Further, it is understood that the specific order or hierarchy of steps in the methods disclosed are instances of example approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form (e.g., software, processing application) readable by a machine (e.g., a computer). The machine-readable medium may include, but is not limited to, magnetic storage medium (e.g., a hard disk drive), optical storage medium (e.g., CD-ROM); magneto-optical storage medium, read only memory (ROM); random access memory (RAM); erasable programmable memory (e.g., EPROM and EEPROM); flash memory; or other types of medium suitable for storing electronic instructions.

Figure 7:
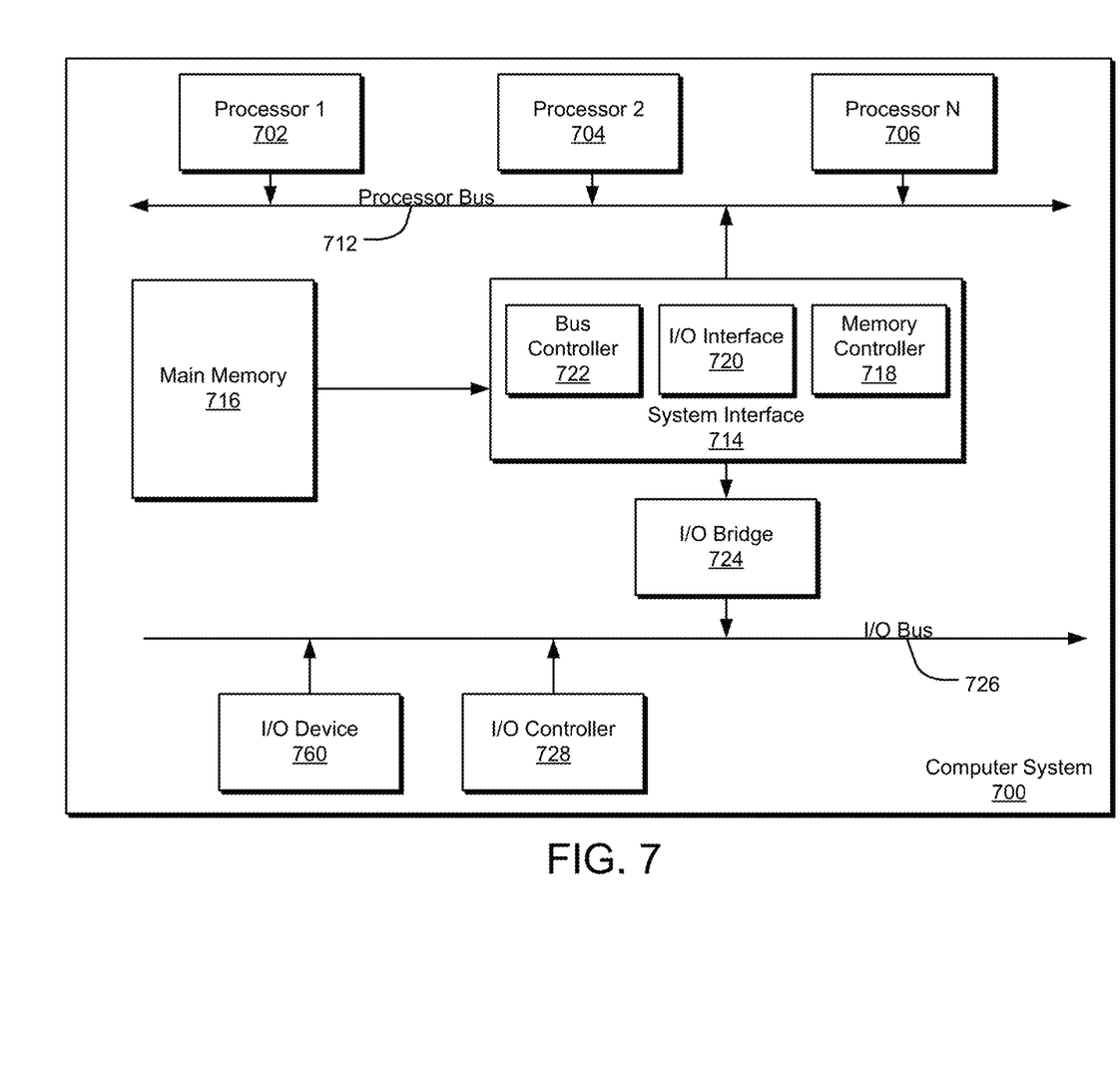
FIG. 7 is a block diagram illustrating an example of a computing device or computer system which may be used in implementing the embodiments of the present disclosure.

For example, FIG. 7 is a block diagram illustrating an example of a computing device or computer system 700 which may be used in implementing the embodiments of the present disclosure. The computer system (system) includes one or more processors 702-706. Processors 702-706 may include one or more internal levels of cache (not shown) and a bus controller or bus interface unit to direct interaction with the processor bus 712. Processor bus 712, also known as the host bus or the front side bus, may be used to couple the processors 702-706 with the system interface 714. System interface 714 may be connected to the processor bus 712 to interface other components of the system 700 with the processor bus 712. For example, system interface 714 may include a memory controller 713 for interfacing a main memory 716 with the processor bus 712. The main memory 716 typically includes one or more memory cards (not shown). System interface 714 may also include an input/output (I/O) interface 720 to interface one or more I/O bridges or I/O devices with the processor bus 712. One or more I/O controllers and/or I/O devices may be connected with the I/O bus 726, such as I/O controller 728 and I/O device 730, as illustrated.

I/O device 730 may also include an input device (not shown), such as an alphanumeric input device, including alphanumeric and other keys for communicating information and/or command selections to the processors 702-706. Another type of user input device includes cursor control, such as a mouse, a trackball, or cursor direction keys for communicating direction information and command selections to the processors 702-706 and for controlling cursor movement on the display device.

System 700 may include a dynamic storage device, referred to as main memory 716, or a random access memory (RAM) or other computer-readable devices coupled to the processor bus 712 for storing information and instructions to be executed by the processors 702-706. Main memory 716 also may be used for storing temporary variables or other intermediate information during execution of instructions by the processors 702-706. System 700 may include a read only memory (ROM) and/or other static storage device coupled to the processor bus 712 for storing static information and instructions for the processors 702-706. The system set forth in FIG. 7 is but one possible example of a computer system that may employ or be configured in accordance with aspects of the present disclosure.

According to one embodiment, the above techniques may be performed by computer system 700 in response to processor 704 executing one or more sequences of one or more instructions contained in main memory 716. These instructions may be read into main memory 716 from another machine-readable medium, such as a storage device. Execution of the sequences of instructions contained in main memory 716 may cause processors 702-706 to perform the process steps described herein. In alternative embodiments, circuitry may be used in place of or in combination with the software instructions. Thus, embodiments of the present disclosure may include both hardware and software components.

A machine readable medium includes any mechanism for storing or transmitting information in a form (e.g., software, processing application) readable by a machine (e.g., a computer). Such media may take the form of, but is not limited to, non-volatile media and volatile media. Non-volatile media includes optical or magnetic disks. Volatile media includes dynamic memory, such as main memory 716. Common forms of machine-readable medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions.

Embodiments of the present disclosure include various operations or steps, which are described in this specification. The steps may be performed by hardware components or may be embodied in machine-executable instructions, which may be used to cause a general-purpose or special-purpose processor programmed with the instructions to perform the steps. Alternatively, the steps may be performed by a combination of hardware, software and/or firmware.

It is believed that the present disclosure and many of its attendant advantages will be understood by the foregoing description, and it will be apparent that various changes may be made in the form, construction, and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

What is claimed is:

1. A backup/recovery system for a computing environment, the backup/recovery system comprising:
   a computing device comprising at least one processor and at least one memory to store an agent that is executed by the at least one processor to:
   obtain a recovery plan (RP) comprising one or more provisioning steps to be performed for provisioning a plurality of resources associated with a source computing environment, the RP comprising configuration information associated with a hardware configuration and a software configuration of the source computing environment functioning at a first operational level, the configuration information being sufficient to restore a target computing environment to at least a portion of the first operational level of the source computing environment;
translate the configuration information into a specified format;
output the translated configuration information to a computer-readable file;
read the computer-readable file from a memory structure;
generate a target RP from the computer-readable file; and
provision the target computing environment using the target RP.

2. The backup/recovery system of claim 1, wherein the agent is further executed to store the computer-readable file on the memory structure comprising at least one of a universal serial bus (USB) memory stick or an writeable optical disk.

3. The backup/recovery system of claim 1, wherein the specified format comprises an extensible markup language (XML) format.

4. The backup/recovery system of claim 1, wherein the agent is further executed to transmit the computer-readable file to a target computing environment using a communication network.

5. The backup/recovery system of claim 1, wherein the agent is further executed to:
analyze a hardware configuration of a target computing environment;
compare the hardware configuration of the target computing environment with the hardware configuration of the source computing environment; and
generate an alert for each instance that the hardware configuration of the target computing environment does not match the hardware configuration of the source computing environment.

6. The backup/recovery system of claim 5, wherein the agent is further executed to:
generate a graphical user interface (GUI) for receiving adjustments to the configuration information from a user when the hardware configuration of the target computing environment does not match the hardware configuration of the source computing environment.

7. The backup/recovery system of claim 5, wherein the agent is further executed to:
generate a graphical user interface (GUI) for, prior to provisioning the target computing environment, receiving mapping information for at least one instance of the configuration information from a user; and
mapping the one instance according to the mapping information when the target computing environment is being provisioned.

8. A method comprising:
obtaining, using instructions stored on a non-transitory medium and executed on at least one processor, a recovery plan (RP) comprising one or more provisioning steps to be performed for provisioning a plurality of resources associated with a source computing environment, the RP comprising configuration information associated with a hardware configuration and a software configuration of a source computing environment functioning at a first operational level, the configuration information being sufficient to restore a target computing environment to at least a portion of the first operational level of the source computing environment;
translating, using the instructions, the configuration information into a specified format;
outputting, using the instructions, the translated configuration information to a computer-readable file;
reading, using the instructions, the computer-readable file from a memory structure;
generating, using the instructions, a target RP from the computer-readable file; and
provisioning, using the instructions, the target computing environment using the target RP.

9. The method of claim 8, further comprising storing the computer-readable file on the memory structure comprising at least one of a universal serial bus (USB) memory stick or an writeable optical disk.

10. The method of claim 8, wherein the specified format comprises an extensible markup language (XML) format.

11. The method of claim 8, further comprising transmitting the computer-readable file to a target computing environment using a communication network.

12. The method of claim 8, further comprising:
analyzing a hardware configuration of a target computing environment;
comparing the hardware configuration of the target computing environment with the hardware configuration of the source computing environment; and
generating an alert for each instance that the hardware configuration of the target computing environment does not match the hardware configuration of the source computing environment.

13. The method of claim 12, further comprising:
generating a graphical user interface (GUI) for receiving adjustments to the configuration information from a user when the hardware configuration of the target computing environment does not match the hardware configuration of the source computing environment.

14. The method of claim 12, further comprising:
generating a graphical user interface (GUI) for, prior to provisioning the target computing environment, receiving mapping information for at least one instance of the configuration information from a user; and
mapping the one instance according to the mapping information when the target computing environment is being provisioned.

15. A tangible non-transitory computer-readable medium encoded with a configuration management client comprising instructions that are executable by a processor to:
obtaining a recovery plan (RP) comprising one or more provisioning steps to be performed for provisioning a plurality of resources associated with a source computing environment, the RP comprising configuration information associated with a hardware configuration and a software configuration of a source computing environment functioning at a first operational level, the configuration information being sufficient to restore a target computing environment to at least a portion of the first operational level of the source computing environment;
translating the configuration information into a specified format;
outputting the translated configuration information to a computer-readable file;
reading the computer-readable file from a memory structure;
generating a target RP from the computer-readable file; and provisioning the target computing environment using the target RP.

16. The code tangible non-transitory computer-readable medium encoded with the configuration management client comprising instructions that are executable by a processor of claim 15, further executed to:
   analyzing a hardware configuration of a target computing environment;
   comparing the hardware configuration of the target computing environment with the hardware configuration of the source computing environment; and
   generating an alert for each instance that the hardware configuration of the target computing environment does not match the hardware configuration of the source computing environment.

17. The tangible non-transitory computer-readable medium encoded with the configuration management client comprising instructions that are executable by a processor of claim 16, further executed to:
   generating a graphical user interface (GUI) for receiving adjustments to the configuration information from a user when the hardware configuration of the target computing environment does not match the hardware configuration of the source computing environment.

18. The tangible non-transitory computer-readable medium encoded with the configuration management client comprising instructions that are executable by a processor of claim 15, wherein the specified format comprises an extensible markup language (XML) format.

* * * * *